US012764469B2

(12) United States Patent
Otomo et al.

(10) Patent No.: US 12,764,469 B2
(45) Date of Patent: Oct. 13, 2026

(54) DIAPHRAGM AND ELECTROACOUSTIC TRANSDUCER

(71) Applicant: Panasonic Automotive Systems Co., Ltd., Kanagawa (JP)

(72) Inventors: Keitaro Otomo, Osaka (JP); Hiroyuki Morimoto, Osaka (JP); Mitsukazu Kuze, Osaka (JP); Ryouichi Uemoto, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 131 days.

(21) Appl. No.: 18/808,782

(22) Filed: Aug. 19, 2024

(65) Prior Publication Data

US 2025/0080914 A1 Mar. 6, 2025

(30) Foreign Application Priority Data

Aug. 30, 2023 (JP) ................................ 2023-140462

(51) Int. Cl.

*H04R 7/14* (2006.01)
*H04R 7/12* (2006.01)
*H04R 9/02* (2006.01)
*H04R 9/06* (2006.01)

(52) U.S. Cl.

CPC ............... *H04R 7/14* (2013.01); *H04R 7/122* (2013.01); *H04R 9/025* (2013.01); *H04R 9/06* (2013.01); *H04R 2307/023* (2013.01); *H04R 2307/025* (2013.01); *H04R 2400/11* (2013.01)

(58) Field of Classification Search

CPC . H04R 7/14; H04R 7/12; H04R 7/122; H04R 7/02; H04R 2307/021; H04R 2307/023; H04R 2307/025; H04R 2307/029

See application file for complete search history.

(56) References Cited

U.S. PATENT DOCUMENTS

| | | | | |
|---|---|---|---|---|
| 1,807,225 A * | 5/1931 | Pack | H04R 7/14 | 181/164 |
| 2006/0008111 A1* | 1/2006 | Nagaoka | H04R 7/122 | 381/423 |

(Continued)

FOREIGN PATENT DOCUMENTS

| | | |
|---|---|---|
| JP | 60-181987 | 12/1985 |
| JP | 2-8294 | 1/1990 |

(Continued)

*Primary Examiner* — James K Mooney

(74) *Attorney, Agent, or Firm* — GREENBLUM & BERNSTEIN, P.L.C.

(57) ABSTRACT

A diaphragm to be provided in an electroacoustic transducer includes: a first protrusion that protrudes from at least one of a front face or a back face of the diaphragm and extends in a spiral from a center of the diaphragm or a vicinity of the center toward an outer circumference of the diaphragm; and a second protrusion that protrudes from at least one of the front face or the back face of the diaphragm and extends in a spiral from the center of the diaphragm or a vicinity of the center toward an outer circumference of the diaphragm, the second protrusion extending in a direction opposite to a direction in which the first protrusion extends and intersecting with the first protrusion.

12 Claims, 9 Drawing Sheets

(56) References Cited

U.S. PATENT DOCUMENTS

| | | | | |
|---|---|---|---|---|
| 2006/0062421 | A1* | 3/2006 | Kuribayashi ............ | H04R 7/12<br>381/423 |
| 2009/0175487 | A1 | 7/2009 | Tsuchiya | |
| 2010/0215196 | A1* | 8/2010 | Schulze ................... | H04R 7/16<br>381/423 |
| 2010/0296687 | A1* | 11/2010 | Fujita ....................... | H04R 7/14<br>181/173 |
| 2018/0324526 | A1* | 11/2018 | Itano ........................ | H04R 7/12 |
| 2018/0324529 | A1* | 11/2018 | Kahfizadeh ............ | H04R 9/043 |
| 2019/0182571 | A1 | 6/2019 | Horikiri et al. | |

FOREIGN PATENT DOCUMENTS

| | | |
|---|---|---|
| JP | 2-86299 | 7/1990 |
| JP | 11-215589 | 8/1999 |
| JP | 4793018 | 10/2011 |
| JP | 2021-44685 | 3/2021 |
| JP | 6973396 | 11/2021 |

* cited by examiner

DIAPHRAGM AND ELECTROACOUSTIC TRANSDUCER

CROSS REFERENCE TO RELATED APPLICATION

The present application is based on and claims priority of Japanese Patent Application No. 2023-140462 filed on Aug. 30, 2023.

FIELD

The present disclosure relates to a diaphragm and an electroacoustic transducer including the diaphragm.

BACKGROUND ART

Conventionally, as described in Patent Literature (PTL) 1 to 4, as diaphragms for a loudspeaker which is one example of an electroacoustic transducer, there are diaphragms for which structural strength has been improved through the forming reinforcing ribs which are an aggregate of spiral shapes, hexagons, or the like.

CITATION LIST

Patent Literature

PTL 1: Japanese Patent No. 4793018
PTL 2: Japanese Unexamined Utility Model (Registration) Application Publication No. S60-181987
PTL 3: Japanese Unexamined Patent Application Publication No. 2021-044685
PTL 4: Japanese Unexamined Patent Application Publication No. H11-215589

SUMMARY

However, the loudspeakers described in PTL 1 to 4 described above can be improved upon.

The present disclosure provides a diaphragm and an electroacoustic transducer that are capable of improving upon the above related art.

A diaphragm according to an aspect of the present disclosure is a diaphragm to be provided in an electroacoustic transducer and includes: a first protrusion that protrudes from at least one of a front face or a back face of the diaphragm and extends in a spiral from a center of the diaphragm or a vicinity of the center toward an outer circumference of the diaphragm; and a second protrusion that protrudes from at least one of the front face or the back face of the diaphragm and extends in a spiral from the center of the diaphragm or a vicinity of the center toward an outer circumference of the diaphragm, the second protrusion extending in a direction opposite to a direction in which the first protrusion extends and intersecting with the first protrusion.

An electroacoustic transducer according to an aspect of the present disclosure includes: the above-described diaphragm; a magnetic circuit; a frame that holds the magnetic circuit and the diaphragm; and a voice coil that is connected to the diaphragm and disposed in a magnetic gap of the magnetic circuit.

According to the present disclosure, it is possible to improve upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
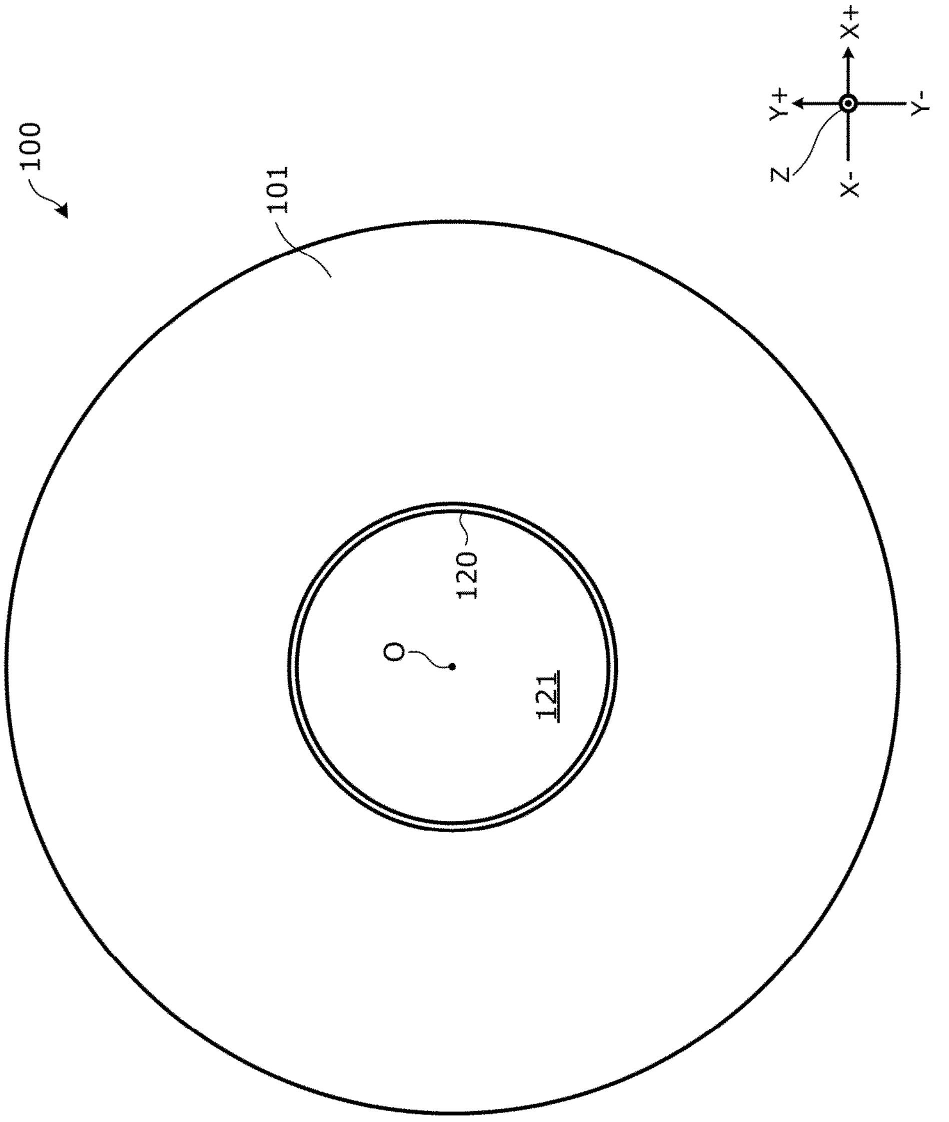
FIG. 1 is a plan view illustrating a diaphragm from the front.

Hereinafter, exemplary embodiments of a diaphragm and an electroacoustic transducer according to the present disclosure will be described with reference to the drawings. It should be noted that each of the subsequent embodiments shows an example for describing the present disclosure, and thus is not intended to limit the present disclosure. For example, the shapes, structures, materials, structural components, the relative positional relationships and connections of the structural components, numerical values, formulas, steps, the processing order of the steps, and so on, shown in the following embodiments are mere examples, and details not described below may be included. Furthermore, although there are cases where geometric expressions, such as "parallel" and "orthogonal", are used, these expressions are not mathematically precise indications and include substantially permissible error, deviation, and the like. Moreover, expressions, such as "simultaneous" and "identical (or the same)", are considered to cover a substantially permissible range of meaning.

Additionally, the drawings are schematic illustrations that may include emphasis, omission, or adjustment of proportion as necessary for the purpose of describing the present disclosure, and thus the shapes, positional relationships, and proportions shown may be different from actuality. Furthermore, the X-axis, Y-axis, and Z-axis which may be shown in the Drawings are arbitrarily set rectangular coordinates for describing the figures. In other words, the Z-axis is not limited to an axis in the vertical direction, and the X-axis and Y-axis are not limited to being axes inside a horizontal plane.

Furthermore, hereinafter, multiple inventions may be comprehensively described as a single embodiment. Moreover, part of the contents in the description below is described as an optional element related to the present disclosure.

Figure 2:
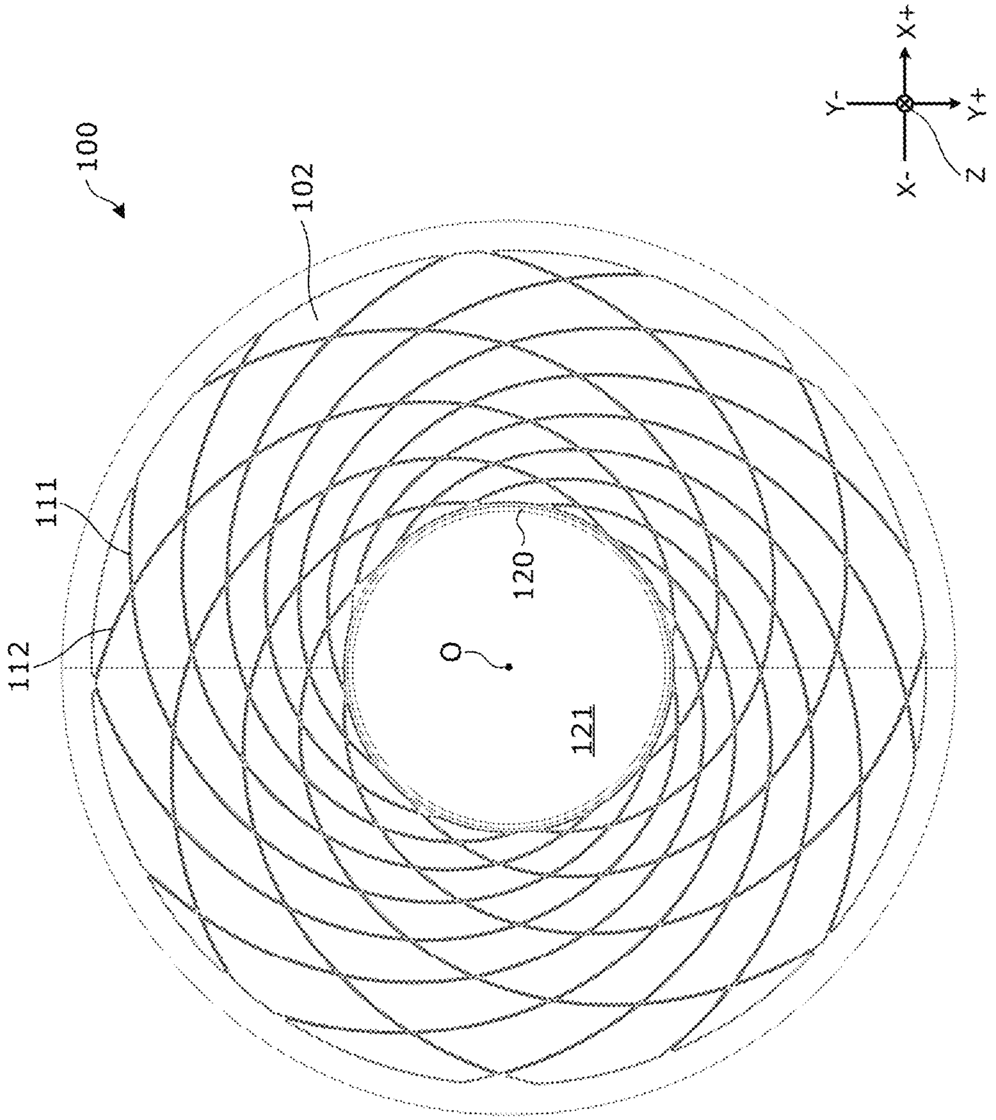
FIG. 2 is a back view illustrating the diaphragm from the back face-side.
Figure 3:
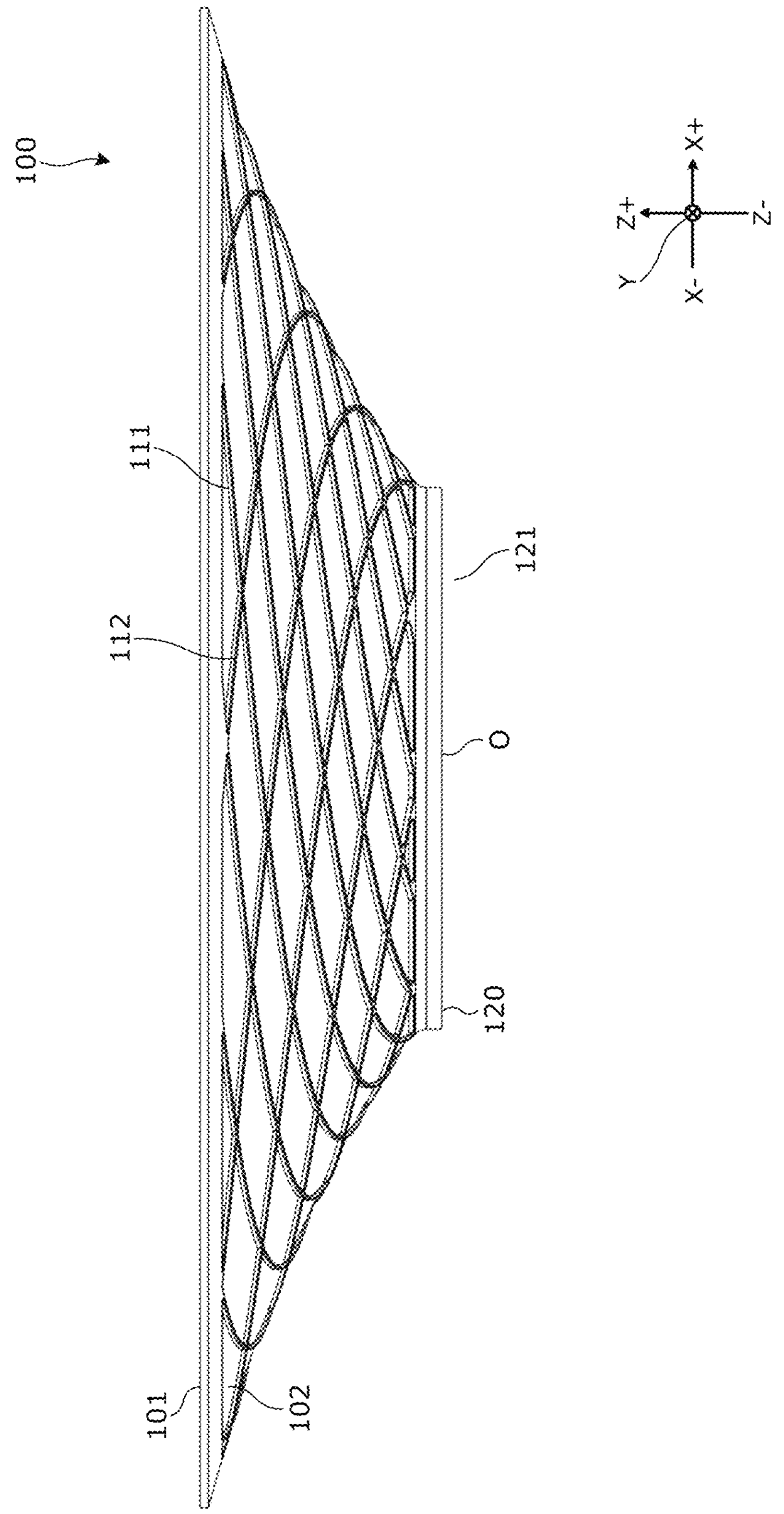
FIG. 3 is a side view illustrating the diaphragm from the side.

FIG. 1 is a plan view illustrating diaphragm 100 from the front face 101-side. FIG. 2 is a back view illustrating diaphragm 100 from the back face 102-side. FIG. 3 is a side view illustrating diaphragm 100 from the side. It should be noted that although a straight line virtually passing through center O of diaphragm 100 is depicted in FIG. 2 (as well as in FIG. 6 and FIG. 7) the appearance of this straight line is a figure-rendering issue, and such a straight line does not actually appear in diaphragm 100 itself.

Diaphragm 100 is a component that is included in an electroacoustic transducer such as a loudspeaker device or a microphone, and either vibrates to cause air to vibrate in order to generate sound or is made to vibrate based on the vibration of air. First protrusions 111 and second protrusions 112 which function as ribs that structurally reinforce diaphragm 100 are provided in at least one of front face 101 (the face on the Z+ side in the figures) or back face 102 (the face on the Z− side in the figures) of diaphragm 100. It should be noted that front face 101 of diaphragm 100 is the face on the side from which sound is emitted or received, and back face 102 of diaphragm 100 is the face on the reverse side of front face 101.

First protrusions 111 are ribs that protrude from at least one of front face 101 or back face 102 of diaphragm 100 and extend in a spiral from center O of diaphragm 100 or the vicinity thereof (in the present embodiment, the vicinity of cone neck 120) toward the outer circumference of diaphragm 100. In the present embodiment, first protrusions 111 protrude from back face 102. When viewed from the back side, first protrusions 111 wind in a spiral in the clockwise direction while heading toward the outer circumference from center O. The number of first protrusions 111 provided in diaphragm 100, although not limited, is preferably selected from a Fibonacci sequence. A plurality of first protrusions 111 are disposed evenly in the circumferential direction. In the present embodiment, diaphragm 100 includes 13 first protrusions 111. The spiral shape of first protrusions 111 is not limited, and, in the present embodiment, first protrusions 111 form a golden spiral in a plan view viewed from the back face 102-side. The height of first protrusions 111 is not limited. In the present embodiment, the height of first protrusions 111 is higher than the thickness of diaphragm 100 at portions where protrusions are not provided.

Second protrusions 112 extend in a spiral from center O of diaphragm 100 or the vicinity thereof (in the present embodiment, the vicinity of cone neck 120) toward the outer circumference of diaphragm 100. Second protrusions 112 extend in the opposite direction as first protrusions 111 and intersect with first protrusions 111. Second protrusions 112 are ribs that protrude from at least one of front face 101 or back face 102 of diaphragm 100. In the present embodiment, second protrusions 112 protrude from back face 102, in the same manner as first protrusions 111. When viewed from the back side, second protrusions 112 wind in a spiral in the counter-clockwise direction while heading toward the outer circumference from center O. The number of second protrusions 112 provided in diaphragm 100, although not limited, is different from the number of first protrusions 111 and preferably selected from a Fibonacci sequence. A plurality of second protrusions 112 are disposed evenly in the circumferential direction. In the present embodiment, diaphragm 100 includes 8 second protrusions 112. The spiral shape of second protrusions 112 is not limited, and, in the present embodiment, second protrusions 112 form the same golden spiral with first protrusions 111 in a plan view viewed from the back face 102-side. The height of second protrusions 112 is not limited. In the present embodiment, the height of second protrusions 112 is the same as that of first protrusions 111, and is higher than the thickness of diaphragm 100 at portions where protrusions are not provided.

In the present embodiment, in diaphragm 100, there are a plurality of portions each bordered (defined) by two adjacent first protrusions 111 and two adjacent second protrusions 112, and the areas of the bordered portions are mutually different.

The shape of diaphragm 100 is not limited. In the present embodiment, diaphragm 100 is in the shape of a cone that is circular in a plan view. Through hole 121 that is connected with voice coil 231 (described later) is provided at the central portion of diaphragm 100. Diaphragm 100 includes, in the circumference of through hole 121, cylindrical cone neck 120 for reinforcing the connection with voice coil 231.

The material of diaphragm 100 is not limited. For example, diaphragm 100 may be formed by papermaking using at least one of pulp or a synthetic fiber such as polyester fiber, and may be formed from a resin into which a reinforcing material has been mixed, or a resin into which hollow glass has been mixed. Furthermore, diaphragm 100 is formed integrally with first protrusions 111 and second protrusions 112.

Figure 4:
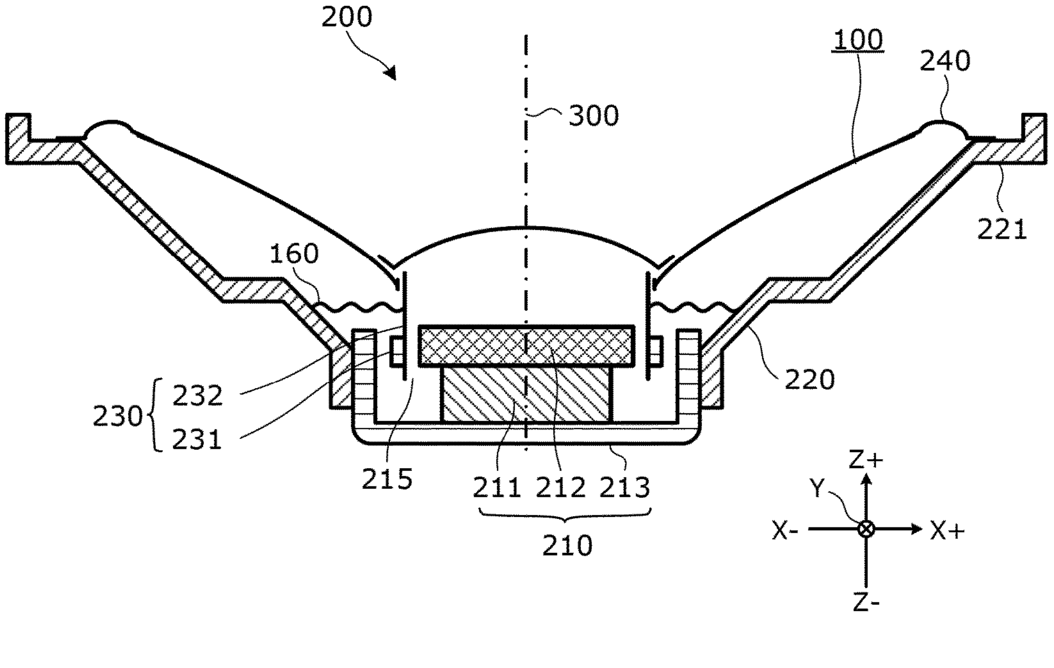
FIG. 4 is a cross-sectional view of a speaker that includes the diaphragm.

FIG. 4 is a cross-sectional view of loudspeaker device 200 which is one example of an electroacoustic transducer including diaphragm 100. It should be noted that, in FIG. 4, illustration of first protrusions 111 and second protrusions 112 is omitted. As illustrated in FIG. 4, loudspeaker device 200 includes diaphragm 100, magnetic circuit 210, frame 220 that holds magnetic circuit 210 and diaphragm 100, and voice coil 231 that is connected to diaphragm 100 and disposed in magnetic gap 215 of magnetic circuit 210.

In the present embodiment, magnetic circuit 210 included in loudspeaker device 200 is an inner magnetism type magnetic circuit formed by sandwiching magnetized magnet 211 between upper plate 212 and yoke 213.

Yoke 213 of magnetic circuit 210 is connected to frame 220. Loop-shaped edge 240 that connects the outer circumferential end portion of diaphragm 100 and frame 220 is bonded to peripheral end portion 221 of frame 220. The central portion of diaphragm 100 is connected to one end of voice coil body 230. The other end of voice coil body 230 is disposed to fit in magnetic gap 215 of magnetic coil 210. It should be noted that, in the present embodiment, voice coil body 230 is exemplified as including voice coil 231 and bobbin 232 around which voice coil 231 is wound. However, it is also acceptable to have voice coil body 230 that does not include bobbin 232. Furthermore, bobbin 232 of voice coil body 230 is supported by annular damper 160 that connects frame 220 and voice coil body 230 in a bridge-like manner.

Moreover, although loudspeaker device 200 including inner magnetism type magnetic circuit 210 is described, the present disclosure is not limited to such, and diaphragm 100 may be applied to loudspeaker device 200 including magnetic circuit 210 that is of the outer magnetism type.

Figure 5:
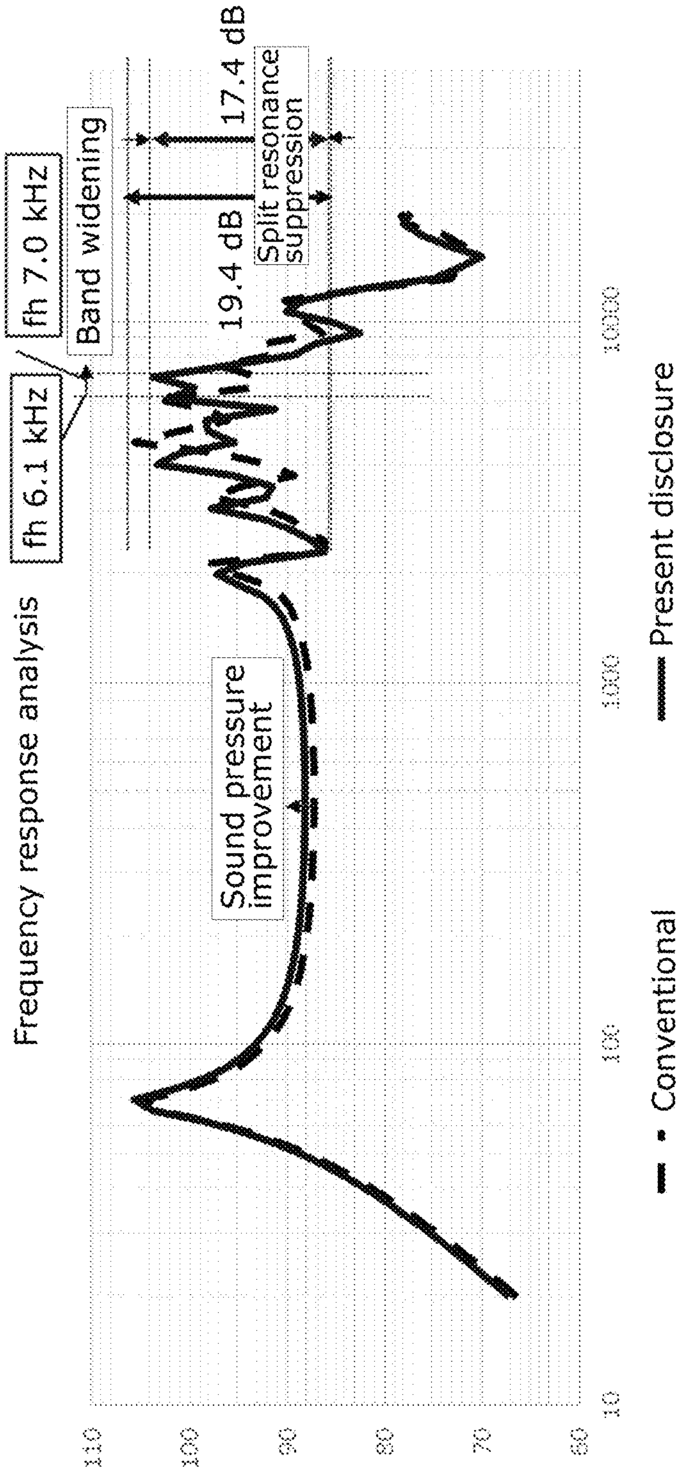
FIG. 5 is a graph illustrating the difference in sound pressure-frequency response between a loudspeaker device that includes a conventional diaphragm and a loudspeaker device that includes the diaphragm according to an embodiment of the present disclosure.

FIG. 5 is a graph illustrating the difference in sound pressure-frequency response between a loudspeaker device that includes a conventional diaphragm and loudspeaker device 200 that includes diaphragm 100 according to the present embodiment. As illustrated in FIG. 5, with diaphragm 100, sound pressure is improved as a whole compared to the conventional diaphragm. Furthermore, compared to the conventional diaphragm, the edge at which sound pressure drops toward the higher frequencies shifts to the high-frequency side, and thus the band is widened. Furthermore, split resonance occurring at the high-frequency band is suppressed compared to the conventional diaphragm.

With loudspeaker device 200 according to the present embodiment, it is possible to obtain a loudspeaker device in which the split resonance occurring as a result of partitioning diaphragm 100 using the ribs (protrusions) is effectively suppressed. Furthermore, the loudspeaker device high-range threshold frequency can be expanded, high fidelity reproduction becomes possible, and sound quality with high clarity can be realized.

It should be noted that the present disclosure is not limited to the above-described embodiments. For example, other embodiments that can be realized by arbitrarily combining structural elements or removing some structural elements described in the present Specification may be embodiments of the present disclosure. Furthermore, variations obtainable through various modifications to the above-described embodiments that can be conceived by a person of ordinary skill in the art without departing from the essence of the present disclosure, that is, the meaning of the recitations in the Claims are included in the present disclosure.

For example, in diaphragm 100, among the plurality of portions bordered (defined) by adjacent first protrusions 111 and adjacent second protrusions 112, the thickness of arbitrarily identified first portions and the thickness of second portions that are different from the first portions may be different.

Figure 6:
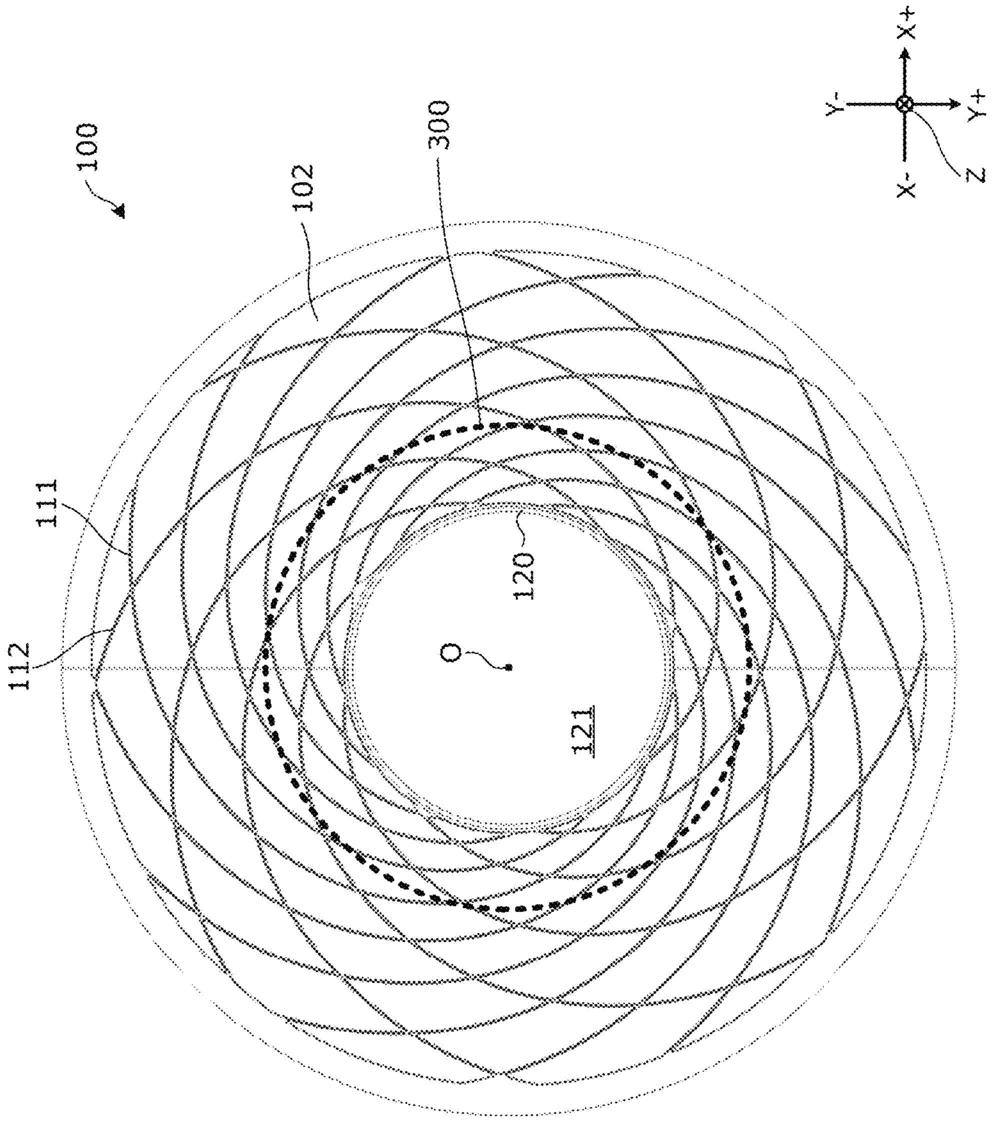
FIG. 6 is a back view illustrating, from the backside, a diaphragm according to Other Example 1.

The first portions may be disposed in the central portion of diaphragm 100 or the vicinity thereof, and the second portions may be disposed in the peripheral portion of diaphragm 100. Specifically, as illustrated in FIG. 6, portions inside or intersecting with circular virtual borderline 300 may be defined as the first portions, the remaining portions (outside virtual borderline 300) may be defined as the second portions, and the thickness of the first portions may be different from the thickness of the second portions.

Figure 7:
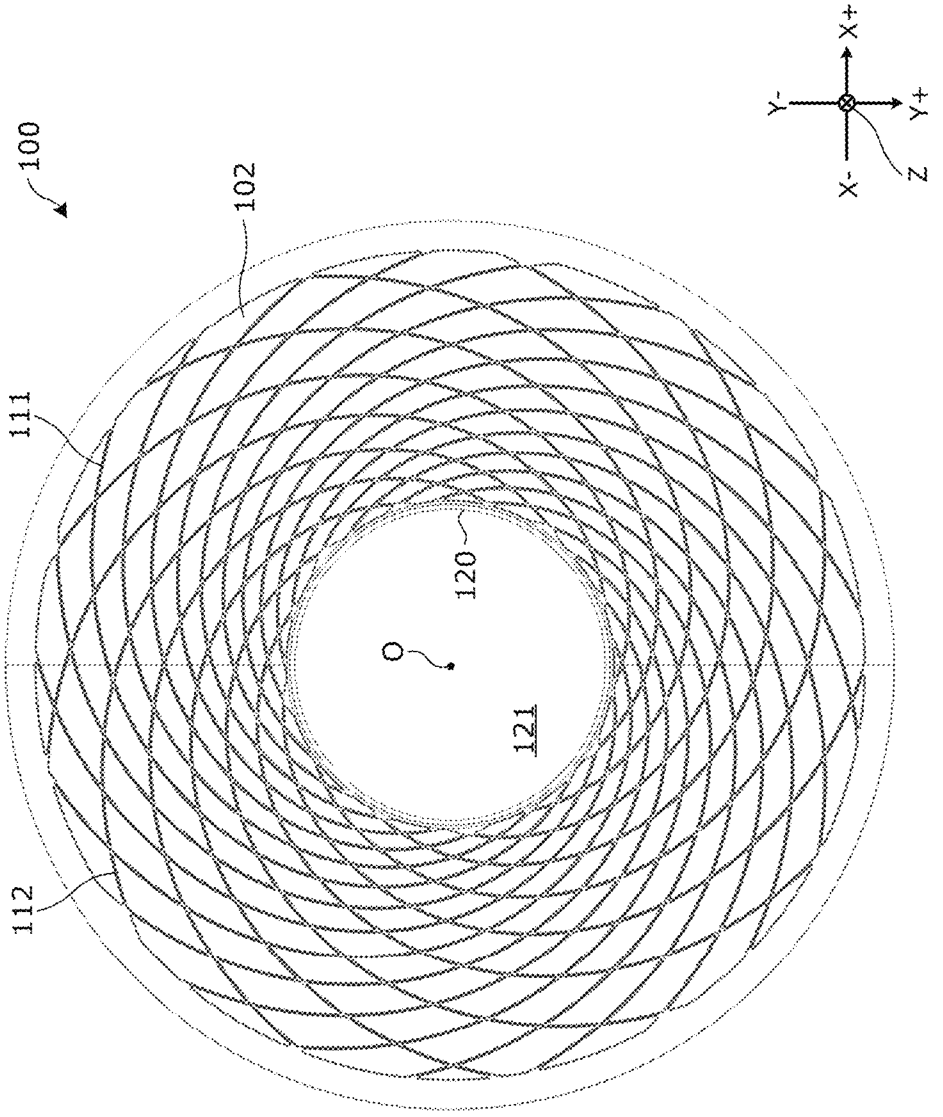
FIG. 7 is a back view illustrating, from the backside, a diaphragm according to Other Example 2.

Furthermore, the number of first protrusions 111 and second protrusions 112 are not limited to 13 and 8, respectively. As illustrated in FIG. 7, the number of first protrusions 111 and second protrusions 112 may be 21 and 13, respectively, and so on (both selected from a Fibonacci sequence). Furthermore, the number of first protrusions 111 may be less than the number of second protrusions 112.

Furthermore, although first protrusions 111 and second protrusions 112 are described as solid ribs, first protrusions 111 and second protrusions 112 may be hollow humps protruding from at least one of front face 101 and back face 102. Specifically, first protrusions 111 and second protrusions 112 may be hollow ridges (humps) that are hollow and protrude from at least one of front face 101 or back face 102, and sink into the other of front face 101 or back face 102.

Figure 8:
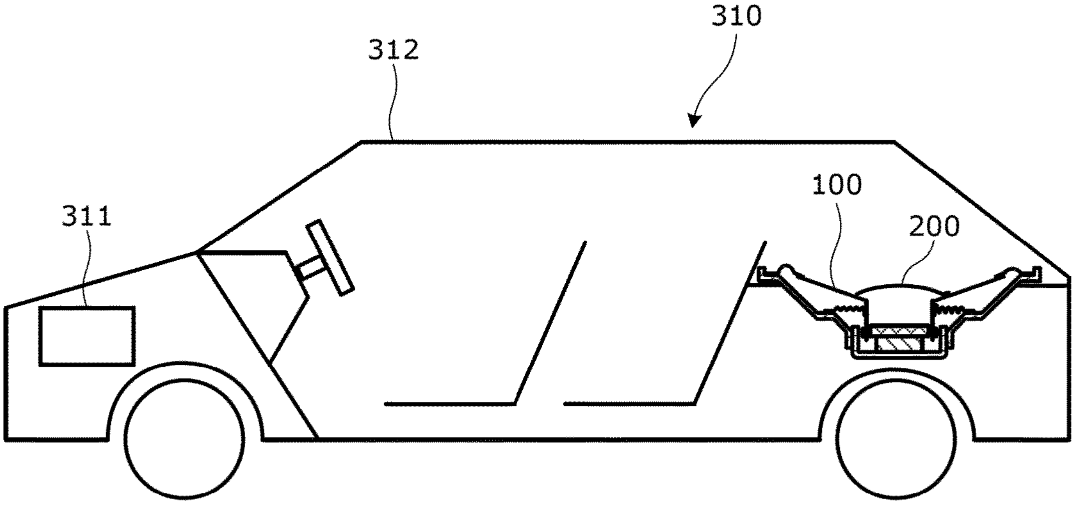
FIG. 8 is a cross-sectional view of a car which is one example of a mobile body to which a loudspeaker device including the diaphragm is attached.

Furthermore, the electroacoustic transducer including diaphragm 100 may be included in a mobile body. FIG. 8 is a cross-sectional view of car 310 which is an example of a mobile body to which loudspeaker device 200 including diaphragm 100 is attached. Car 310 includes loudspeaker devices 200, each of which includes diaphragm 100, in the front panel, pillars, doors, and so on, aside from in a rear tray. Loudspeakers 200 are used as part of a car navigation system and/or a car audio system. Car 310 includes driving means 311, and causes loudspeaker devices 200 to travel together with car body 312 that functions as a casing that houses loudspeaker devices 200.

Figure 9:
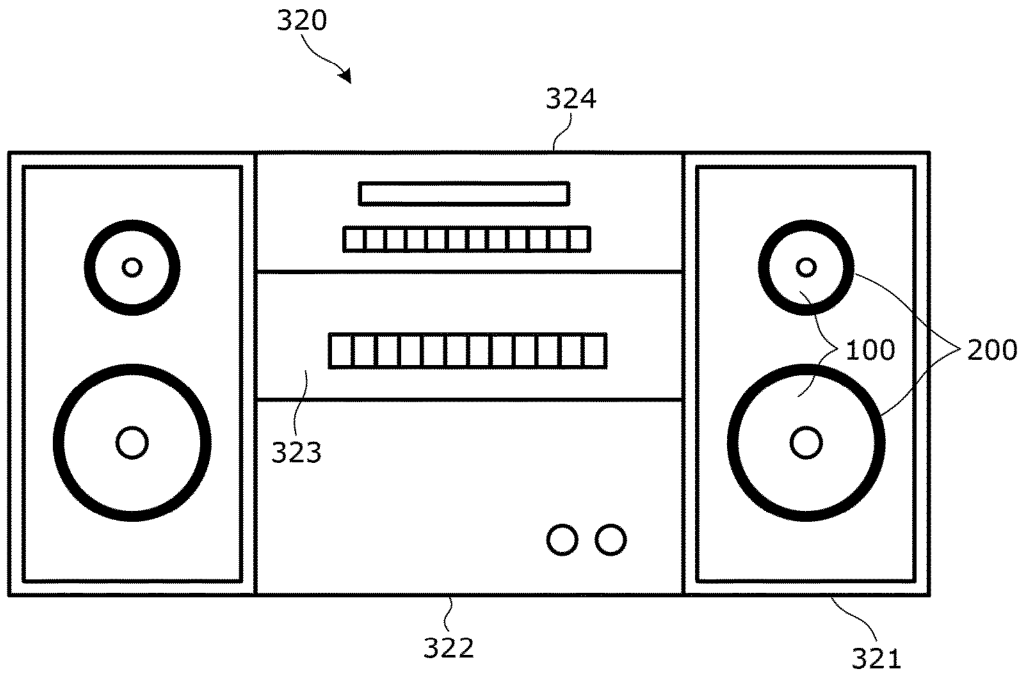
FIG. 9 is a diagram illustrating a mini component system which is one example of an electronic device to which the loudspeaker device including the diaphragm is attached.

Furthermore, loudspeaker device 200 that includes diaphragm 100 may be included in an electronic device as illustrated in FIG. 9. FIG. 9 is a diagram illustrating another usage example of loudspeaker device 200 including diaphragm 100. Audio mini component system 320 will be described as one example of an electronic device that includes loudspeaker device 200 including diaphragm 100.

In mini component system 320, two loudspeaker devices 200 are built into each of two enclosures 321. Furthermore, mini component system 320 includes amplifier 322 that includes an amplifying circuit for an electrical signal that is inputted to loudspeaker devices 200, tuner 323 that outputs a source signal to be inputted to amplifier 322, and compact disc (CD) player 324. In mini component system 320 which is an audio mini component system, a music signal inputted from tuner 323 or CD player 324 is amplified by amplifier 322, and sound is discharged by loudspeaker devices 200 based on the amplified signal. It should be noted that, aside from mini component system 320, examples of an electronic device include a car audio system or a portable audio device, video devices such as a liquid-crystal television, an organic electroluminescence (EL) display television, or the like, an information communication device such as a mobile phone, or the like, and computer-related devices, and so on.

Diaphragm 100 according to a first aspect is a diaphragm to be provided in an electroacoustic transducer and includes: first protrusion 111 that protrudes from at least one of front face 101 or back face 102 of diaphragm 100 and extends in a spiral from the center of diaphragm 100 or the vicinity of the center toward the outer circumference of diaphragm 100; and second protrusion 112 that protrudes from at least one of front face 101 or back face 102 of diaphragm 100 and extends in a spiral from the center of diaphragm 100 or the vicinity of the center toward the outer circumference of diaphragm 100, second protrusion 112 extending in a direction opposite to a direction in which first protrusion 111 extends and intersecting with first protrusion 111.

According to diaphragm 100 according to the first aspect, by providing the plurality of protrusions, diaphragm 100 can be structurally reinforced, sound pressure can be improved, and split resonance can be effectively suppressed.

Diaphragm 100 according to a second aspect is diaphragm 100 according to the first aspect including a plurality of first protrusions 111; and a plurality of second protrusions 112, in which the total number of first protrusions 111 and the total number of second protrusions 112 are different.

According to diaphragm 100 according to the second aspect, split resonance can be more effectively suppressed.

Diaphragm 100 according to a third aspect is diaphragm 100 according to the second aspect in which the total number of first protrusions 111 and the total number of second protrusions 112 are selected from a Fibonacci sequence.

Accordingly, the areas of portions bordered (defined) by adjacent first protrusions 111 and adjacent second protrusions 112 can easily be made different from each other, and thus split resonance can be suppressed.

Diaphragm 100 according to a fourth aspect is diaphragm 100 according to the first or second aspect in which portions of diaphragm 100 that are each bordered by first protrusion 111 and second protrusion 112 have mutually different areas.

According to diaphragm 100 according to the fourth aspect, split resonance can be suppressed.

Diaphragm 100 according to a fifth aspect is diaphragm 100 according to any one of the first to fourth aspects in which the thickness of a first portion of diaphragm 100 that is bordered by first protrusion 111 and second protrusion 112 and a thickness of a second portion of diaphragm 100 that is different from the first portion are different.

Diaphragm 100 according to a sixth aspect is diaphragm 100 according to the fifth aspect in which the first portion is disposed in a central portion of diaphragm 100 or in the vicinity of the central portion, and the second portion is disposed in a circumferential portion of diaphragm 100.

According to diaphragm 100 according to the fifth aspect and the sixth aspect, the structural strength of diaphragm 100 can be varied for each portion (region), and thus sound pressure-frequency response can be arbitrarily adjusted.

Diaphragm 100 according to a seventh aspect is diaphragm 100 according to the sixth aspect in which the thickness the first portion is greater than the thickness of the second portion.

According to diaphragm 100 according to the seventh aspect, an even greater advantageous effect can be achieved.

Diaphragm 100 according to an eighth aspect is diaphragm 100 according to any one of the first to seventh aspects in which at least one of first protrusion 111 or second protrusion 112 extends in a golden spiral.

According to diaphragm 100 according to the eighth aspect, the design can be improved.

Diaphragm 100 according to a ninth aspect is diaphragm 100 according to any one of the first to seventh aspects in which diaphragm 100 is made of resin.

Diaphragm 100 according to a tenth aspect is diaphragm 100 according to any one of the first to seventh aspects in which diaphragm 100 is made of resin containing hollow glass.

An electroacoustic transducer according to an eleventh aspect includes diaphragm 100 according any one of the first to tenth aspects; magnetic circuit 210; frame 220 that holds magnetic circuit 210 and diaphragm 100; and voice coil 231 that is connected to diaphragm 100 and disposed in magnetic gap 215 of magnetic circuit 210.

According to the electroacoustic transducer according to the eleventh aspect, split resonance can be effectively suppressed.

FURTHER INFORMATION ABOUT TECHNICAL BACKGROUND TO THIS APPLICATION

The disclosure of the following patent application including specification, drawings, and claims is incorporated herein by reference in its entirety: Japanese Patent Application No. 2023-140462 filed on Aug. 30, 2023.

INDUSTRIAL APPLICABILITY

A diaphragm and an electroacoustic transducer according to the present disclosure can be applied to an electronic device, such as an audiovisual device or an information communication device, a mobile body such as a car, and so on.

The invention claimed is:

1. A diaphragm to be provided in an electroacoustic transducer, the diaphragm comprising:

a plurality of first protrusions that protrude from at least one of a front face or a back face of the diaphragm and extends in a spiral from a center of the diaphragm or a vicinity of the center toward an outer circumference of the diaphragm; and a plurality of second protrusions that protrude from at least one of the front face or the back face of the diaphragm and extends in a spiral from the center of the diaphragm or a vicinity of the center toward an outer circumference of the diaphragm, the second protrusions extending in a direction opposite to a direction in which the first protrusions extend and intersecting with the first protrusions, wherein a total number of the first protrusions is different from a total number of the second protrusions.

2. The diaphragm according to claim 1, wherein the total number of the first protrusions and the total number of the second protrusions are selected from a Fibonacci sequence.

3. The diaphragm according to claim 1, wherein portions of the diaphragm that are each bordered by the first protrusions and the second protrusions have mutually different areas.

4. The diaphragm according to claim 1, wherein a thickness of a first portion of the diaphragm that is bordered by the first protrusions and the second protrusions is different from a thickness of a second portion of the diaphragm that is distinct from the first portion.

5. The diaphragm according to claim 4, wherein the first portion is disposed in a central portion of the diaphragm or in a vicinity of the central portion, and the second portion is disposed in a circumferential portion of the diaphragm.

6. The diaphragm according to claim 5, wherein the thickness the first portion is greater than the thickness of the second portion.

7. The diaphragm according to claim 1, wherein at least one of the first protrusions or the second protrusions extends in a golden spiral.

8. The diaphragm according to claim 1, wherein the diaphragm is made of resin.

9. The diaphragm according to claim 1, wherein the diaphragm is made of resin containing hollow glass.

10. An electroacoustic transducer comprising:

the diaphragm according to claim 1;

a magnetic circuit;

a frame that holds the magnetic circuit and the diaphragm; and a voice coil that is connected to the diaphragm and disposed in a magnetic gap of the magnetic circuit.

11. The diaphragm according to claim 1, wherein the first protrusions and the second protrusions are ribs formed integrally with the diaphragm.

12. The diaphragm according to claim 1, wherein the first protrusions and the second protrusions are hollow and are each formed in a hollow ridge shape that protrudes from the at least one of the front face or the back face and sinks into the other of the front face or the back face.

* * * * *